United States Patent
Giacobbe et al.

[11] 3,912,717
[45] Oct. 14, 1975

[54] VINYLBENZYLTHIO- AND VINYLBENZYLDITHIO-CARBAMATES

[75] Inventors: Thomas J. Giacobbe, Concord, Calif.; Elizabeth J. Norton, Midland, Mich.

[73] Assignee: The Dow Chemical Company, Midland, Mich.

[22] Filed: May 2, 1973

[21] Appl. No.: 356,529

[52] U.S. Cl............... 260/239 BF; 71/88; 71/94; 71/95; 71/100; 260/293.73; 260/326.4; 260/326.83; 260/455 A
[51] Int. Cl.² .......... C07C 153/09, C07C 153/11, C07D 207/04; C07D 295/20
[58] Field of Search..... 260/455 A, 239 BF, 293.73, 260/326.82, 326.4, 326.83

[56] References Cited
UNITED STATES PATENTS
2,187,719  1/1940  Williams .................. 260/239 BF
3,424,730  1/1969  Lee ........................ 260/455 A

*Primary Examiner*—Alton D. Rollins
*Attorney, Agent, or Firm*—Theodore Post; C. Kenneth Bjork

[57] ABSTRACT

Vinylbenzylthio- and vinylbenzyldithio-carbamates corresponding to the following formula

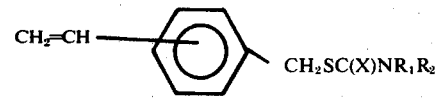

wherein X is oxygen or sulfur, and each of $R_1$ and $R_2$ is lower alkyl, lower alkenyl or together with the nitrogen, is a 5- to 7-membered polymethyleneimino group. The compounds are useful as herbicides.

10 Claims, No Drawings

VINYLBENZYLTHIO- AND VINYLBENZYLDITHIO- CARBAMATES

SUMMARY OF THE INVENTION

The present invention concerns a new series of compounds, the vinylbenzylthiocarbamates and the vinylbenzyldithiocarbamates corresponding to the formula

wherein X represents O or S, and $R_1$ and $R_2$ represent lower alkyl, lower alkenyl or, together with the nitrogen, represent a 5- to 7-membered polymethyleneimino group which group may contain as a substituent a lower alkyl group. The compounds are prepared by reacting two molar proportions of a corresponding secondary amine with carbon disulfide or carbon oxysulfide to form an amine salt which is then reacted with vinylbenzyl chloride to form the amine hydrochloride and the vinylbenzylthio- or dithiocarbamate according to the following equations:

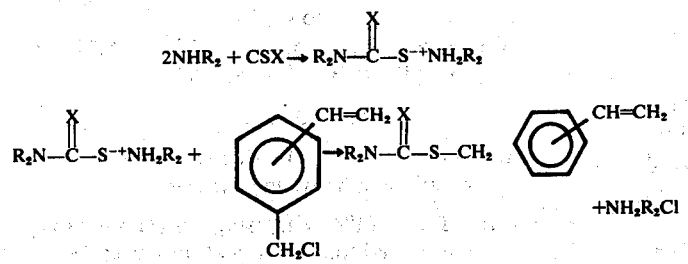

The compounds and appropriate formulations containing them have herbicidal activity, primarily preemergent herbicidal activity.

In the present specification and claims, the term "lower alkyl" designates a straight or branched-chain alkyl group containing from 1, to 2, to 3, to 4 carbon atoms such as, for example, methyl, ethyl, propyl, isopropyl, n-butyl, isobutyl, sec-butyl and tert-butyl. The term "lower alkenyl" designates a 2 to 4 carbon atom alkenyl group. The term "5- to 7-membered polymethyleneimino" group designates an imino group having from 4 to 6 methylene groups attached to the nitrogen atom or the corresponding lower alkyl-substituted heterocycle such as, for example, pyrrolidinyl, piperidinyl, hexahydro-1H-azepinyl or their lower alkyl-substituted homologs or analogs. Hereinafter, the compounds of this invention will be referred to as "Compounds" or, in the singular, as "Compound".

DESCRIPTION OF THE PREFERRED EMBODIMENTS

The Compounds are prepared by adding with mixing carbon disulfide or carbon oxysulfide to the amine in solution in ether while maintaining a reaction temperature between minus 10° and 0°C. After the addition is completed, the reaction mixture is stirred at the same temperature until reaction is substantially completed to form the amine salt. To the resulting amine salt, vinylbenzyl chloride is added rapidly and the reaction mixture is permitted to return to room temperature. Either technical grade vinylbenzyl chloride consisting of 60 percent of the meta-isomer and 40 percent of the para-isomer, or a 3- or 4-vinylbenzyl chloride may be used. The products in either case are substantially identical, as expected. The reaction mixture is stirred at room temperature to substantial completion as monitored by gas liquid chromatography (GLC) for the disappearance of the vinylbenzyl chloride peak. By-product amine hydrochloride is removed by filtration and excess ether is removed under reduced pressure. The compounds are identified by elemental analysis and by their infrared and nuclear magnetic resonance spectra.

In practice, the following Procedure A is used to prepare the dithiocarbamate Compounds while following Procedure B is used to prepare the monothiocarbamate Compounds.

Procedure A: In a 1-liter, three-necked flask equipped with a stirrer, a condenser, a thermometer and a dropping funnel are placed 0.5 mole of a secondary amine and 250 ml. of ether. The reaction flask is placed in a methanol-ice bath, and the reaction mixture is cooled to between minus 10° and 0°C. To the reaction mixture is added dropwise at such a rate as to maintain the minus 10° to 10°C. temperature, 0.5 mole of carbon disulfide. After the addition is completed, the reaction mixture is stirred at minus 10° to 0°C. for 90 minutes. Thereupon, 0.25 mole of vinylbenzyl chloride is added rapidly through the dropping funnel, and the reaction mixture is permitted to return to room temperature. The reaction mixture is stirred at room temperature (25°–30°C) and monitored by GLC for the disappearance of the vinylbenzyl chloride peak. The amine hydrochloride byproduct is removed by filtration, and the excess ether is removed under reduced pressure to give the product. The residual product may be distilled if a purified product is desired. This is usually not necessary, since the reaction product normally is greater than 95% pure. As an inhibitor to polymerization, 1% by weight of p-methoxyphenol is added to the final product, and the product is kept refrigerated.

Procedure B: In a 1-liter, three-necked flask equipped with a magnetic stirrer, a condenser, a thermometer and a glass tube which extends below the surface of the reaction solution and is connected to a cylinder of carbon oxysulfide are placed 0.5 mole of a secondary amine and 250 ml. of ether. The reaction flask is placed in a methanol-ice bath, and the reaction mixture is cooled to between minus 10° and 0°C. Carbon oxysulfide is bubbled into the reaction mixture at such a rate as to maintain the minus 10° to 0°C. temperature and until the gain in weight of the reaction flask is equal to 0.5 mole of carbon oxysulfide. After the addition is completed, the reaction mixture is stirred at minus 10° to 0°C. for 90 minutes. Thereupon, 0.25 mole of vinylbenzyl chloride is added rapidly through the dropping funnel, and the reaction mixture is permitted to return to room temperature. The reaction mixture is stirred at room temperature (25°–30°C.) and monitored by GLC for the disappearance of the vinylbenzyl chloride peak. The amine hydrochloride byproduct is removed by filtration and the excess ether is removed under reduced pressure to give the product. The product may be distilled if a purity greater than 95% is desired. This is usually not necessary. As an inhibitor to polymerization, 1% by weight of p-methoxyphenol is added to the final product, and the product is kept refrigerated. In all of the following examples, technical grade vinylbenzyl chloride is used.

EXAMPLE 1

Carbamothioic Acid: Bis ((1-methylethyl))-, S-(3(or 4)ethenylphenyl)methyl ester Preceding Procedure B is followed, using 0.1 mole of diisopropylamine. GLC at 5 days showed the reaction at 69% completion. The vinylbenzyl chloride was removed by steam distillation to yield 6.7 g. of amber-colored oil product.

Anal. Calcd. for $C_{16}H_{23}NOS$: C, 69.27; H, 8.36; N, 5.05. Found: C, 69.29; H, 8.22; N, 4.78.

EXAMPLE 2

Carbamodithioic Acid: Bis(1-methylethyl)-, (3(or 4)ethenylphenyl)methyl ester

Preceding Procedure A was followed, using diisopropylamine. GLC at 7 days showed the reaction at 49% completion. The vinylbenzyl chloride was removed from one-half (27.6 g.) of the crude oil product to yield 17.5 g. of amber-colored oil product.

Anal. Calcd. for $C_{16}H_{23}NS_2$: C, 65.48; H, 7.90; N, 4.77. Found: C, 64.7; H, 7.95; N, 4.85.

EXAMPLE 3

Carbamothioic Acid: Diethyl-, S-(3(or 4)ethenylphenyl)methyl ester

Procedure B was followed, using diethylamine. GLC at 3 days showed the reaction at 98% completion to yield 59.1 g. of amber-colored oil product.

Anal. Calcd. for $C_{14}H_{19}NOS$: C, 67.43; H, 7.68; N, 5.62. Found: C, 67.17; H, 7.58; N, 5.71.

EXAMPLE 4

Carbamodithioic Acid: Diethyl-, ((3(or 4)ethenylphenyl)methyl)ester

Procedure A was followed, using diethylamine. GLC at one day showed the reaction at 97% completion to yield 65.6 g. of amber-colored oil product.

Anal. Calcd. for $C_{14}H_{19}NH_2$: C, 63.35; H, 7.21; N, 5.28. Found: C, 63.45; H, 7.06; N, 5.08.

EXAMPLE 5

1H-Azepine-1-Carbamothioic Acid: Hexahydro-, S-(3(or 4)ethenylphenyl)methyl ester Procedure B was followed, using hexahydro-1H-azepine. GLC at 4 days showed the reaction at 98% completion to yield 69.7 g. of orange-colored oil product.

Anal. Calcd. for $C_{16}H_{21}NOS$: C, 69.78; H, 7.69; N, 5.09. Found: C, 69.67; H, 7.49; N, 5.31.

EXAMPLE 6

Carbamothioic Acid: Di-2-Propenyl-, S-(3(or 4)-ethenylphenyl)methyl ester

Procedure B was followed, using di-2-propenylamine. GLC at 6 days showed the reaction at 93% completion to yield 68.7 g. of yellow-green oil product.

Anal. Calcd. for $C_{16}H_{19}NOS$: C, 70.29; H, 7.00; N, 5.12. Found: C, 70.00; H, 7.08; N, 4.94.

EXAMPLE 7

Carbamothioic Acid: Dimethyl-, S-(3(or 4)-ethenylphenyl)methyl ester

Procedure B was followed, using dimethylamine. GLC at 4 days showed the reaction at 98% completion to yield 56.5 g. of amber-colored oil product.

Anal. Calcd. for $C_{12}H_{15}NOS$: C, 65.12; H, 6.83; N, 6.33. Found: C, 65.21; H, 6.75; N, 6.17.

EXAMPLE 8

Carbamodithioic Acid: Dimethyl-, (3(or 4)-ethenylphenyl)methyl ester

Procedure A was followed, using dimethylamine. GLC at 11 days showed the reaction at 93% completion to yield 60.0 g. of yellow oil product.

Anal. Calcd. for $C_{12}H_{15}NS_2$: C, 60.72; H, 6.37; N, 5.90. Found: C, 60.50; H, 6.58; N, 6.02.

EXAMPLE 9

Carbamothioic Acid: Butylethyl-, S-(3(or 4)-ethenylphenyl)methyl ester

Procedure B was followed, using butylethylamine. GLC at 3 days showed the reaction at 99% completion to yield 68.2 g. of dark amber oil product.

Anal. Calcd. for $C_{16}H_{23}NOS$: C, 69.27; H, 8.36; N, 5.05. Found: C, 69.25; H, 8.27; N, 4.90.

EXAMPLE 10

Carbamothioic Acid: Dipropyl-, S-(3(or 4)-ethenylphenyl)methyl ester

Procedure B was followed, using dipropylamine. GLC at 3 days showed the reaction at 98% completion to yield 68.2 g. of dark amber-colored oil.

Anal. Calcd. for $C_{16}H_{23}NOS$: C, 69.27; H, 8.36; N, 5.05. Found: C, 69.24; H, 8.05; N, 5.11.

The compounds of this invention are viscous high boiling oils. They do not need to be dried prior to use or formulation. They are readily soluble in agricultural spray oils and petroleum distillates such as, for example, diesel fuel, kerosene, fuel oil, naphthas and Stoddard solvent. And since they are liquids, the Compounds lend themselves readily to liquid formulations and concentrates and especially oil-in-water emulsion formulations.

According to the present invention, it has been discovered that the growth of plants may be suppressed by the action of the Compounds. More particularly, it has been discovered that the growth of germinant seeds may be controlled by exposing the seeds to the action of a growth-inhibiting amount of the Compounds. Further, the Compounds have a high degree of persistency in soil and give excellent controls of many undesirable plant species for periods ranging up to several months.

The exposure of seeds to the action of the Compounds gives rise to varying degrees of response in germinant seeds depending upon the seed and the dosage of the Compounds employed. When very large dosages are dispersed in growth media, a persistent inhibition of the growth of seeds is obtained. This approaches a sterilizing action. The weathering action of the sun, rain and possibly the decomposition of the Compounds by the action of bacteria eventually frees the growth media of the toxicant. When more dilute dosages of the Compounds are dispersed in growth media, the growth of the seeds of many broadleaf and narrowleaf weed species are suppressed.

The exposure of the seeds to the action of a growth-inhibiting amount of one or more of the Compounds is essential for the practice of the present invention. The exact dosage to be employed to obtain such exposure is dependent upon such factors as soil type, depth to which the Compounds are distributed in the soil and the amount of rainfall, as well as upon the plant species to be controlled. Good results are obtained when the germinant seeds are exposed to dosages of one or more of the Compounds of from 4 to 150 pounds or more per acre.

Methods and compositions employing the oil-soluble Compounds comprise a preferred embodiment of the present invention. The method of the present invention may be carried out by distributing the unmodified Compounds in growth media. However, the present method also embraces the employment of liquid, dust or granular compositions containing the Compounds. In such usage, the toxicant Compounds may be modified with one or a plurality of additaments or herbicide adjuvants, including water or other liquid carriers, surface active dispersing agents and finely divided inert solids. Depending upon the concentration of toxicant, such augmented compositions are adapted to be distributed in soil or to be employed as concentrates and subsequently diluted with additional inert carrier to produce the ultimate treating compositions.

The exact concentration of the Compounds to be employed in the treating compositions is not critical and may vary considerably provided the required dosage of effective agent is supplied in the growth medium. The concentration of one or more of the Compounds in liquid compositions employed to supply the desired dosage generally is from about 0.01 to 50 percent by weight, although concentrations as high as 90 percent by weight are sometimes employed. In dusts or granules, the concentration of the Compounds may be from about 0.1 to 20 percent by weight. In compositions to be employed as concentrates, the Compounds may be present in a concentration of from 5 to 95 percent by weight.

The quantity of treating composition to be applied may vary considerably provided that the required dosage of the Compounds is applied in sufficient of the finished composition to facilitate the penetration and distribution of said Compounds in growth media. The required amount of the Compounds in the soil conveniently may be supplied per acre treated in from 10 to 27,000 gallons or more of the liquid carrier or in from 50 to 2,000 pounds of the inert solid carrier. In the application of dusts, good results are obtained with from 40 to 200 pounds of finished dust per acre, the only requirement being that the required toxicant dosage be supplied in sufficient dust to achieve good coverage of the growth media.

Liquid compositions containing the desired amount of one or more of the Compounds may be prepared by dispersing the Compounds in an organic liquid, with or without the aid of a suitable surface-active dispersing agent such as an ionic or non-ionic emulsifying agent. Suitable organic liquid carriers include the agricultural spray oils and the petroleum distillates such as diesel fuel, kerosene, fuel oil, naphthas and Stoddard solvent. Among the latter, the petroleum distillates are generally preferred. The organic liquid compositions may contain an external water phase as a diluent carrier for the toxicant ingredient. Such compositions comprise an oil-in-water emulsion, i.e., a mixture of water, emulsifying agent and organic liquid. In the liquid compositions, the choice of dispersing and emulsifying agent and the amount thereof employed is dictated by the nature of the composition and by the ability of the agent to facilitate the dispersion of the Compounds in the carrier to produce the desired composition. Dispersing and emulsifying agents which may be employed in the compositions include the condensation products of alkylene oxides with phenols and organic acids, alkyl aryl sulfonates, polyoxyalkylene derivatives of sorbitan esters, complex ether alcohols, mahogany soaps and the like.

In the preparation of dust compositions, one or more of the Compounds is dispersed in and on a finely divided inert solid such as clay, talc, chalk, gypsum and the like. In such operations, the finely divided carrier is mechanically mixed with the Compounds. Similarly, dust compositions containing the Compounds may be prepared from various of the solid surface active dispersing agents such as bentonite, fuller's earth, attapulgite and other clays. Depending upon the proportion of ingredients, these dust compositions may be employed as concentrates and subsequently diluted with additional solid surface active dispersing agent or with chalk, talc or gypsum and the like to obtain the desired amount of the Compounds in a composition adapted to be employed for the suppression of the growth of plants. Also, such dust compositions may be dispersed in water, with or without the aid of a dispersing agent, to form spray mixtures.

When operating in accordance with the present invention, growth inhibiting amounts of one or more of the Compounds are dispersed in soil or growth media in any convenient fashion. Applications to growth media may be carried out by simply mixing with the media, sometimes in admixture with fertilizer, by application to the surface of soil and thereafter dragging or discing into the soil to the desired depth, or by employing a liquid carrier to accomplish the penetration and impregnation. The application of spray and dust compositions to the surface of soil may be carried out by conventional methods, e.g., power dusters, boom and hand sprayers and spray dusters.

In a further method, the distribution of one or more of the Compounds in soil may be accomplished by introducing the Compounds by dispersing them or emulsifying them in the water employed to irrigate the soil. In such procedures, the amount of water may be varied with the porosity and water holding capacity of the soil to obtain a desired depth of distribution of the Compounds.

Consequently, the inventive methods and compositions are useful in soil incorporation for perennial grass control; for selective annual grass control in beet, rape, potato, pea, flax and sunflower crops; and for a chemical summer fallow.

EXAMPLE 15

Herbicidal Activity

The herbicidal activity data for the Compounds of Examples 1–10 at 10 lb/acre as shown in the following Table illustrate the predominately pre-emergent activity (Pre) of the Compounds against grasses as determined by conventional pot tests. The greatest pre-emergent activity for the group of the Compounds of Examples 1 through 10 was found when the amine moiety contained 4 to 6 carbon atom substituents arranged in either a straight or branched chain and in either a symmetrical or unsymmetrical configuration. In all cases of pre-emergent activity, Compounds having the

moiety generally were found to have greater activity than those having the

moiety. The most active pre-emergent Compound was that of Example 10. In addition to the pre-emergent activity, four of the ten compounds prepared, those of Examples 3, 5, 7 and 8, also showed some post-emergent activity (Post). In these tests, pots were filled to within one inch of the top with a medium-textured soil and seeds of wild oats, foxtail, barnyard grass, crabgrass and sorghum were sown in their appropriate area. The seeds were then covered with a ½ inch layer of a sandy soil and the Compounds formulated as an oil-in-water emulsion were drenched separately onto the soil surface in sufficient volume to wet the top 1½ to 2 inches of soil at a concentration of 10 lb/acre. For post-emergent activity, seedlings were sprayed to run off with a dispersion containing 4000 ppm of Compound. The pots were maintained in a greenhouse and were top-watered as necessary. Final readings were made about two weeks after treatment, the exact time depending upon the rate of plant growth. Readings were based on the germination and the growth of treated plants compared with that of untreated plants. Readings of 0 = no visible effects and 100 = all plants dead. Observations were also made on the type of injury, such as malformation and stunting. Readings are given below.

| Compound of Example | Test | Wild Oats | Fox-tail | Barn-yard Grass | Crab-grass | Sorghum |
|---|---|---|---|---|---|---|
| 1 | Pre | 90 | 98 | 98 | 80 | 95 |
|   | Post | 60 | 70 | 70 | 55 | 0 |
| 2 | Pre | 25 | 80 | 75 | 100 | 0 |
|   | Post | 25 | 55 | 55 | 0 | 0 |
| 3 | Pre | 90 | 98 | 100 | 85 | 98 |
|   | Post | 60 | 75 | 75 | 20 | 40 |
| 4 | Pre | 20 | 70 | 90 | 50 | 80 |
|   | Post | 0 | 0 | 0 | 0 | 0 |
| 5 | Pre | 75 | 50 | 98 | 85 | 90 |
|   | Post | 45 | 60 | 70 | 40 | 20 |
| 6 | Pre | 75 | 98 | 98 | 90 | 98 |
|   | Post | 0 | 0 | 0 | 0 | 0 |
| 7 | Pre | 50 | 95 | 95 | 70 | 85 |
|   | Post | 50 | 80 | 85 | 30 | 0 |
| 8 | Pre | 0 | 0 | 0 | 0 | 0 |
|   | Post | 85 | 25 | 70 | 100 | 0 |
| 9 | Pre | 95 | 98 | 98 | 90 | 85 |
|   | Post | 40 | 50 | 50 | 70 | 20 |
| 10 | Pre | 100 | 100 | 100 | 100 | 100 |
|    | Post | 25 | 75 | 75 | 25 | — |

A reading of 40 or higher with stunting of the seedlings indicated that the seedlings would not recover adequately to become competitive in a vigorous crop.

The pre-emergent herbicidal formulation used in this example was prepared by dissolving 30 parts by weight of Compound in 2400 parts by weight of acetone and dispersing this solution in 100 ml. of water containing 0.02% Tween 20 polyoxyethylene (20) sorbitan monolaurate emulsifier. For post-emergent application, a dilution to 4000 ppm of Compound was prepared by dispersing the acetone solution of the Compound in 4.5 ml. of water containing 0.1% Tween 20 emulsifier.

What is claimed is:

1. A compound of the formula

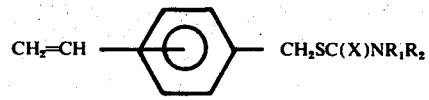

wherein X represents O or S, and $R_1$ and $R_2$ represent lower alkyl, lower alkenyl, or, together with the nitrogen, pyrrolidino, piperidino or hexamethyleneimino, provided that when $NR_1R_2$ represents hexamethyleneimino, di-2-propenylamino, butylethylamino or dipropylamino, X represents O.

2. The compound of claim 1 which is carbamothioic acid: bis((1-methylethyl))-, S-(3(or 4)ethenylphenyl)-methyl ester.

3. The compound of claim 1 which is carbamothioic acid: diethyl-, S-(3(or 4)ethenylphenyl)methyl ester.

4. The compound of claim 1 which is 1H-azepine-1-carbamothioic acid: hexahydro-, S-(3(or 4)ethenylphenyl)methyl ester.

5. The compound of claim 1 which is carbamothioic acid: di-2-propenyl-, S-(3(or 4)ethenylphenyl)methyl ester.

6. The compound of claim 1 which is carbamothioic acid: dimethyl-, S-(3(or 4)ethenylphenyl)methyl ester.

7. The compound of claim 1 which is carbamodithioic acid: dimethyl-, (3(or 4)-ethenylphenyl)methyl ester.

8. The compound of claim 1 which is carbamothioic acid: butylethyl-, S-(3(or 4)ethenylphenyl)methyl ester.

9. The compound of claim 1 which is carbamothioic acid: dipropyl-, S-(3(or 4)ethenylphenyl)methyl ester.

10. A compound which is a member of the group consisting of carbamothioic acid: bis ((1-methylethyl))-, S-(3(or 4)ethenylphenyl)methyl ester; carbamothioic acid: diethyl-, S-(3(or 4)ethenylphenyl)methyl ester; 1H-azepine-1-carbamothioic acid: hexahydro-, S-(3(or 4)ethenylphenyl)-methyl ester; carbamothioic acid: di-2-propenyl-, S-(3(or 4)-ethenylphenyl)methyl ester; carbamothioic acid: dimethyl-, S-(3(or 4)ethenylphenyl)methyl ester; carbamodithioic acid: dimethyl-, (3(or 4)ethenylphenyl)-methyl ester; carbamothioic acid: butylethyl-, S-(3(or 4)ethenylphenyl)methyl ester and carbamothioic acid: dipropyl-, S-(3(or 4)ethenylphenyl)-methyl ester.

* * * * *

UNITED STATES PATENT AND TRADEMARK OFFICE
CERTIFICATE OF CORRECTION

PATENT NO. : 3,912,717
DATED : October 14, 1975
INVENTOR(S) : Thomas J. Giacobbe, Elizabeth J. Norton It is certified that error appears in the above-identified patent and that said Letters Patent are hereby corrected as shown below:

Column 2, line 25, "10°C." in the second occurrence should read --0°C.--;

Column 4, line 50, "compounds" should read --Compounds--.

Signed and Sealed this twenty-fifth Day of May 1976

[SEAL]

Attest:

RUTH C. MASON
Attesting Officer

C. MARSHALL DANN
Commissioner of Patents and Trademarks